(12) United States Patent
Eichhorn et al.

(10) Patent No.: US 7,844,125 B2
(45) Date of Patent: **\*Nov. 30, 2010**

(54) SYSTEMS AND METHODS FOR IMAGE PATTERN RECOGNITION

(75) Inventors: Ole Eichhorn, Westlake Village, CA (US); Dirk G. Soenksen, Carlsbad, CA (US)

(73) Assignee: Aperio Technologies, Inc., Vista, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 12/400,981

(22) Filed: Mar. 10, 2009

(65) Prior Publication Data

US 2009/0169118 A1 Jul. 2, 2009

Related U.S. Application Data

(60) Continuation of application No. 11/836,713, filed on Aug. 9, 2007, now Pat. No. 7,502,519, which is a division of application No. 10/774,971, filed on Feb. 9, 2004, now Pat. No. 7,257,268.

(60) Provisional application No. 60/451,083, filed on Feb. 28, 2003.

(51) Int. Cl.
*G06K 9/00* (2006.01)
*G06K 9/68* (2006.01)
(52) U.S. Cl. .................................. 382/253; 382/218
(58) Field of Classification Search ................ 382/253, 382/232–251, 209–220, 224–228, 128–133, 382/173, 170, 171, 164, 165, 181, 195; 375/240.01–240.29; 348/417.1, 418.1, 422.1; 702/181

See application file for complete search history.

(56) References Cited

U.S. PATENT DOCUMENTS 3,643,015 A 2/1972 Davidovits et al.

(Continued)

FOREIGN PATENT DOCUMENTS

EP 0339582 4/1989

(Continued)

OTHER PUBLICATIONS

Hamilton, Eric, JPEG File Interchange Format:, Version 1.02, Sep. 1, 1992; C-Cube Microsystem, Milpitas, CA.

(Continued)

*Primary Examiner*—Sherali Ishrat
(74) *Attorney, Agent, or Firm*—Pattric J. Rawlins; Procopio Cory Hargreaves & Savitch LLP

(57) ABSTRACT

Systems and methods for image pattern recognition comprise digital image capture and encoding using vector quantization ("VQ") of the image. A vocabulary of vectors is built by segmenting images into kernels and creating vectors corresponding to each kernel. Images are encoded by creating a vector index file having indices that point to the vectors stored in the vocabulary. The vector index file can be used to reconstruct an image by looking up vectors stored in the vocabulary. Pattern recognition of candidate regions of images can be accomplished by correlating image vectors to a pre-trained vocabulary of vector sets comprising vectors that correlate with particular image characteristics. In virtual microscopy, the systems and methods are suitable for rare-event finding, such as detection of micrometastasis clusters, tissue identification, such as locating regions of analysis for immunohistochemical assays, and rapid screening of tissue samples, such as histology sections arranged as tissue microarrays ("TMAs").

20 Claims, 7 Drawing Sheets

U.S. PATENT DOCUMENTS

| | | | |
|---|---|---|---|
| 4,673,988 A | 6/1987 | Jansson et al. | |
| 4,700,298 A | 10/1987 | Palcic et al. | |
| 4,742,558 A | 5/1988 | Ishibashi et al. | |
| 4,744,642 A | 5/1988 | Yoshinaga et al. | |
| 4,760,385 A | 7/1988 | Jansson et al. | |
| 4,777,525 A | 10/1988 | Preston et al. | |
| 4,845,552 A | 7/1989 | Jaggi et al. | |
| 4,960,999 A | 10/1990 | McKean et al. | |
| 4,987,480 A | 1/1991 | Lippman et al. | |
| 5,086,477 A | 2/1992 | Yu et al. | |
| 5,172,228 A | 12/1992 | Israelsen | |
| 5,187,754 A | 2/1993 | Currin et al. | |
| 5,231,663 A | 7/1993 | Earl et al. | |
| 5,400,145 A | 3/1995 | Suita et al. | |
| 5,412,214 A | 5/1995 | Suzuki et al. | |
| 5,495,535 A | 2/1996 | Smilansky et al. | |
| 5,578,832 A | 11/1996 | Trulson et al. | |
| 5,633,948 A | 5/1997 | Kegelmeyer, Jr. | |
| 5,644,356 A | 7/1997 | Swinson et al. | |
| 5,672,861 A | 9/1997 | Fairley et al. | |
| 5,710,835 A | 1/1998 | Bradley | |
| 5,714,756 A | 2/1998 | Park et al. | |
| 5,790,710 A | 8/1998 | Price et al. | |
| 5,793,969 A | 8/1998 | Kamentsky et al. | |
| 5,796,861 A | 8/1998 | Vogt | |
| 5,834,758 A | 11/1998 | Trulson et al. | |
| 5,845,013 A | 12/1998 | Bouchard et al. | |
| 5,872,591 A | 2/1999 | Truc et al. | |
| 5,912,699 A | 6/1999 | Hayenga et al. | |
| 5,922,282 A | 7/1999 | Ledley | |
| 5,943,122 A | 8/1999 | Holmes | |
| 5,963,314 A | 10/1999 | Worster et al. | |
| 5,968,731 A | 10/1999 | Layne et al. | |
| 5,991,444 A | 11/1999 | Burt et al. | |
| 5,999,662 A | 12/1999 | Burt et al. | |
| 6,002,789 A | 12/1999 | Olsztyn et al. | |
| 6,005,964 A | 12/1999 | Reid et al. | |
| 6,049,421 A | 4/2000 | Raz et al. | |
| 6,078,681 A | 6/2000 | Silver | |
| 6,091,846 A | 7/2000 | Lin et al. | |
| 6,101,265 A | 8/2000 | Bacus et al. | |
| 6,272,235 B1 | 8/2001 | Bacus et al. | |
| 6,327,377 B1 | 12/2001 | Rutenberg et al. | |
| 6,330,348 B1 | 12/2001 | Kerschmann et al. | |
| 6,438,268 B1 | 8/2002 | Cockshott et al. | |
| 6,519,357 B2 | 2/2003 | Takeuchi | |
| 6,711,283 B1 | 3/2004 | Soenksen | |
| 6,714,281 B1 | 3/2004 | Amano et al. | |
| 6,947,869 B2 * | 9/2005 | Palmadesso et al. | 702/181 |
| 7,212,667 B1 | 5/2007 | Shin et al | |
| 7,257,268 B2 * | 8/2007 | Eichhorn et al. | 382/253 |
| 7,502,519 B2 * | 3/2009 | Eichhorn et al. | 382/253 |
| 2001/0017941 A1 | 8/2001 | Chaddha | |

FOREIGN PATENT DOCUMENTS

| | | |
|---|---|---|
| EP | 0871052 | 10/1998 |
| WO | WO 91 14342 | 9/1991 |
| WO | WO 98/39728 | 9/1998 |
| WO | WO 98/44446 | 10/1998 |

OTHER PUBLICATIONS

Adobe Developers Association, "TIFF" revision 6.0, Jun. 3, 1992; Adobe Systems Incorporated, Mountain View, CA.

* cited by examiner

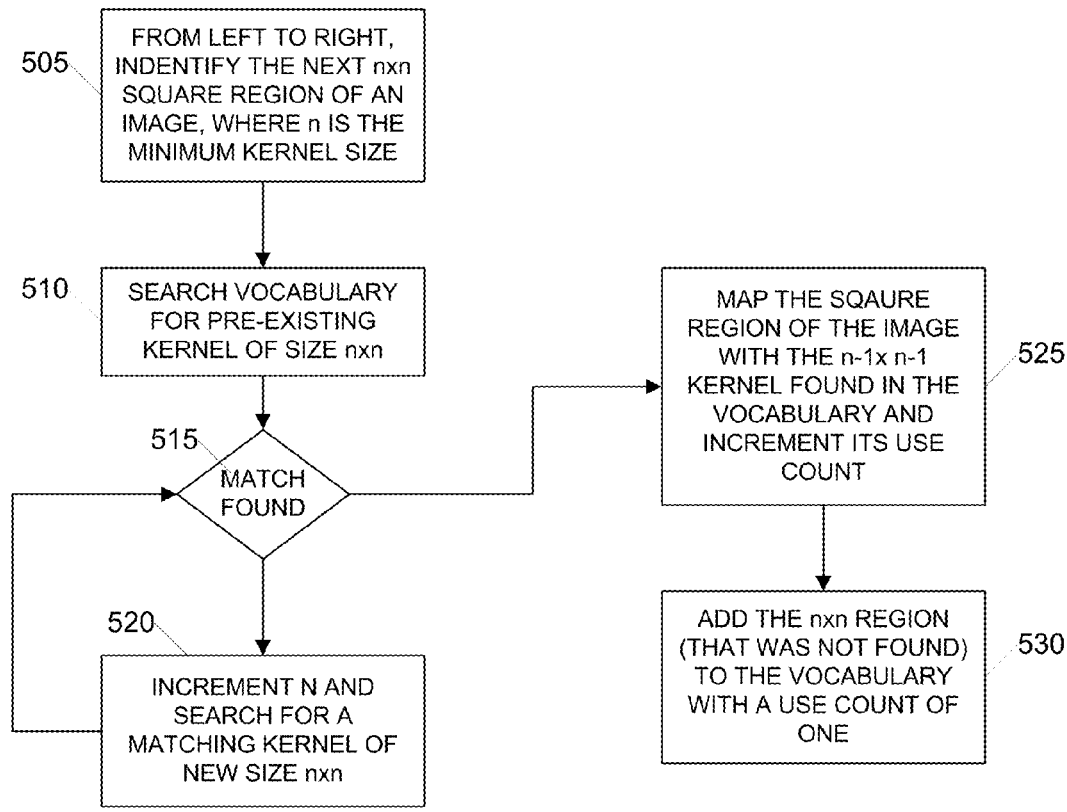

FIG. 5

| slide | JP2 KB | width | height | size Mp | size MB | comp | %tissue |
|---|---|---|---|---|---|---|---|
| vs439_20xn | 230,818 | 39,230 | 33,546 | 1,255 | 3,765 | 16.7 | 70% |
| vs440_20xn | 296,146 | 48,738 | 34,134 | 1,587 | 4,760 | 16.5 | 60% |
| vs441_20xn | 215,070 | 37,339 | 34,369 | 1,224 | 3,672 | 17.5 | 70% |
| vs442_20xn | 369,609 | 52,631 | 37,961 | 1,905 | 5,716 | 15.8 | 65% |
| vs443_20xn | 118,670 | 29,667 | 26,488 | 749 | 2,248 | 19.4 | 60% |
| vs482_20xn | 270,844 | 52,619 | 37,461 | 1,880 | 5,640 | 21.3 | 45% |
| vs483_20xn | 149,627 | 35,429 | 31,703 | 1,071 | 3,214 | 22.0 | 45% |
| vs484_20xn | 303,685 | 43,034 | 37,840 | 1,553 | 4,659 | 15.7 | 75% |
| vs485_20xn | 278,714 | 49,734 | 39,962 | 1,895 | 5,686 | 20.9 | 45% |
| vs486_20xn | 297,861 | 52,570 | 35,451 | 1,777 | 5,332 | 18.3 | 55% |

JP2 KB — size of JPEG2000 file in Kbytes
Width — width of image in pixels
Height — height of image in pixels
Size Mp — size of image in Mpixels
Size Mb — size of image in Mbytes
Comp — compression ratio (JP2 vs. image data)
%tissue — approximate %tissue on slide (vs. glass)

Table 0. Sample table of liver slides used for study

FIG. 6

| slide | VIF KB | comp | #vectors | ave vect | VCB MB | idx MB | #vectors | ave vect | idx time | enc time | tot time |
|---|---|---|---|---|---|---|---|---|---|---|---|
| vs439_20xn | 121,702 | 31.7 | 31,148,155 | 6.5 | 818 | 520 | 59,181,494 | 3.2 | 0:00:00 | 0:09:23 | 0:09:23 |
| vs440_20xn | 128,042 | 38.1 | 32,770,657 | 7.1 | 964 | 559 | 68,244,628 | 3.4 | 0:17:25 | 0:10:58 | 0:28:23 |
| vs441_20xn | 110,050 | 34.2 | 28,165,796 | 6.7 | 1,069 | 586 | 75,800,102 | 3.3 | 0:18:49 | 0:10:09 | 0:28:58 |
| vs442_20xn | 153,772 | 38.1 | 39,355,871 | 7.1 | 1,220 | 625 | 86,035,088 | 3.4 | 0:19:50 | 0:12:56 | 0:32:46 |
| vs443_20xn | 54,584 | 42.2 | 13,970,124 | 7.5 | 1,281 | 640 | 89,555,559 | 3.4 | 0:21:16 | 0:09:24 | 0:30:40 |
| vs483_20xn | 24,997 | 131.6 | 6,397,753 | 13.2 | 2,876 | 944 | 168,756,512 | 4.9 | 0:38:40 | 0:21:15 | 0:59:55 |
| vs484_20xn | 45,119 | 105.7 | 11,547,703 | 11.8 | 2,889 | 944 | 169,092,117 | 4.9 | 0:38:50 | 0:22:51 | 1:01:41 |
| vs485_20xn | 42,609 | 136.7 | 10,905,185 | 13.5 | 2,906 | 945 | 169,378,378 | 4.9 | 0:39:00 | 0:24:04 | 1:03:04 |
| vs486_20xn | 42,270 | 129.2 | 10,818,519 | 13.1 | 2,921 | 945 | 169,633,289 | 5.0 | 0:39:12 | 0:23:54 | 1:03:06 |
| vs487_20xn | 18,242 | 168.7 | 4,668,846 | 15.0 | 2,939 | 946 | 169,731,334 | 5.0 | 0:39:22 | 0:21:50 | 1:01:12 |

Slide           - name of slide
VIF KB          - size of vector index file in Kbytes
Comp            - compression ratio (VIF vs. image data)
vectors        - number of vectors in vector index file (number of kernels found in image)
ave vect        - average size of vectors in vector index file (average size of kernels)
VCB MB          - size of vocabulary file after processing in Mbytes
Idx MB          - size of memory-resident index after processing in Mbytes
vectors        - number of vectors in vocabulary
ave vect        - average size of vectors in vocabulary
idx time        - time required to load vocabulary index
enc time        - time required to encode image (after index loaded)
tot time        - total time required for processing (index time plus encode time)

FIG. 7

SYSTEMS AND METHODS FOR IMAGE PATTERN RECOGNITION

RELATED APPLICATION

The present application is a continuation of U.S. patent application Ser. No. 11/836,713 filed Aug. 9, 2007 now U.S. Pat No. 7,502,519, which is a divisional of application Ser. No. 10/774,971 now U.S. Pat. No. 7,257,268 filed Feb. 9, 2004, which claims priority of U.S. provisional application No. 60/451,083 filed Feb. 28, 2003, each of which is hereby incorporated herein by reference in its entirety.

BACKGROUND

1. Field of the Invention

The present invention generally relates to automated inspection of digitized microscope slides and more particularly relates to pattern recognition techniques employed in automated inspection of virtual slides.

2. Related Art

An obstacle to automating microscopic inspection has been the inability to efficiently digitize entire microscope specimens at diagnostic resolutions. Conventional approaches for creating virtual slides have relied on image tiling. Image tiling involves the capture of multiple, small regions of a microscope slide using a traditional charge coupled device ("CCD") camera. These tiles are typically "stitched" together (aligned) to create a large contiguous digital image (mosaic) of an entire slide. A minimum of 2,250 individual camera tiles are required to digitize a typical 15 mm×15 mm area of a slide at 50,000 pixels/inch (0.5 μm/pixel).

Image tiling carries several disadvantages. First, images frequently have distortion because image tiles are limited to a single focal plane from the camera's fixed area objective lens. Second, an image tiling system produces optical aberrations that are circularly symmetric about the center of the image tile. Third, full pixel resolution is usually unavailable because color CCD cameras lose spatial resolution upon interpolation of color values from non-adjacent pixels.

Conventional approaches to pattern recognition are also cumbersome. Despite many years of improvements in optical microscopy, in most cases a human operator is still required to manually evaluate a specimen through the eyepieces of a dedicated instrument. Worldwide, in thousands of clinical laboratories, more time is spent performing manual microscopy than any other in-vitro diagnostics testing procedure. In an estimated 20,000 research laboratories, manual microscopic inspection is an essential tool for screening drug targets and for conducting toxicology studies. While offering immense opportunities for automation, microscopic inspection remains a bastion of manual labor in an environment that is otherwise converting to automated solutions.

Some attempts at computer aided pattern recognition have been made. These approaches to pattern recognition in microscopic images are based on morphological features. A large number of feature metrics (e.g., cell size, nuclear-to-cytoplasmic ratio, roundness, density, color, texture, etc.) are computed to identify "objects" (e.g., cells) that appear in the image. Pattern recognition is achieved by correlating the feature metrics for an unknown object with those of a known object. Feature based approaches have had some success in cytology, where a high level of cell diversity is required to allow objects to be identified. These conventional approaches, however, are immensely complicated or completely untenable for histology imagery data where reliable object segmentation is difficult.

SUMMARY

Systems and methods for image pattern recognition comprise digital image capture and encoding using vector quantization ("VQ") of the image. A vocabulary of vectors is built by segmenting images into kernels and creating vectors corresponding to each kernel. Images are encoded by creating vector index files with indices ("pointers") to the vectors stored in the vocabulary. The vector index files can be used to reconstruct the images by looking up vectors stored in the vocabulary. Pattern recognition of candidate regions of images can be accomplished by correlating image vectors to a pre-trained vocabulary of vector sets comprising vectors that correlate with particular image characteristics. In virtual microscopy, the systems and methods are suitable for rare-event finding, such as detection of micrometastasis clusters, tissue identification, such as locating regions of analysis for immunohistochemical assays, and rapid screening of tissue samples, such as histology sections arranged as tissue microarrays (TMAs).

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is a flow diagram illustrating an example process for creating variable sized kernels according to an embodiment of the present invention;

FIG. 6 is a table diagram summarizing a representative sample of slides used for a study according to an embodiment of the present invention;

FIG. 7 is a table diagram summarizing the results of a plurality of slides from a study according to an embodiment of the present invention;

DETAILED DESCRIPTION

Figure 1:
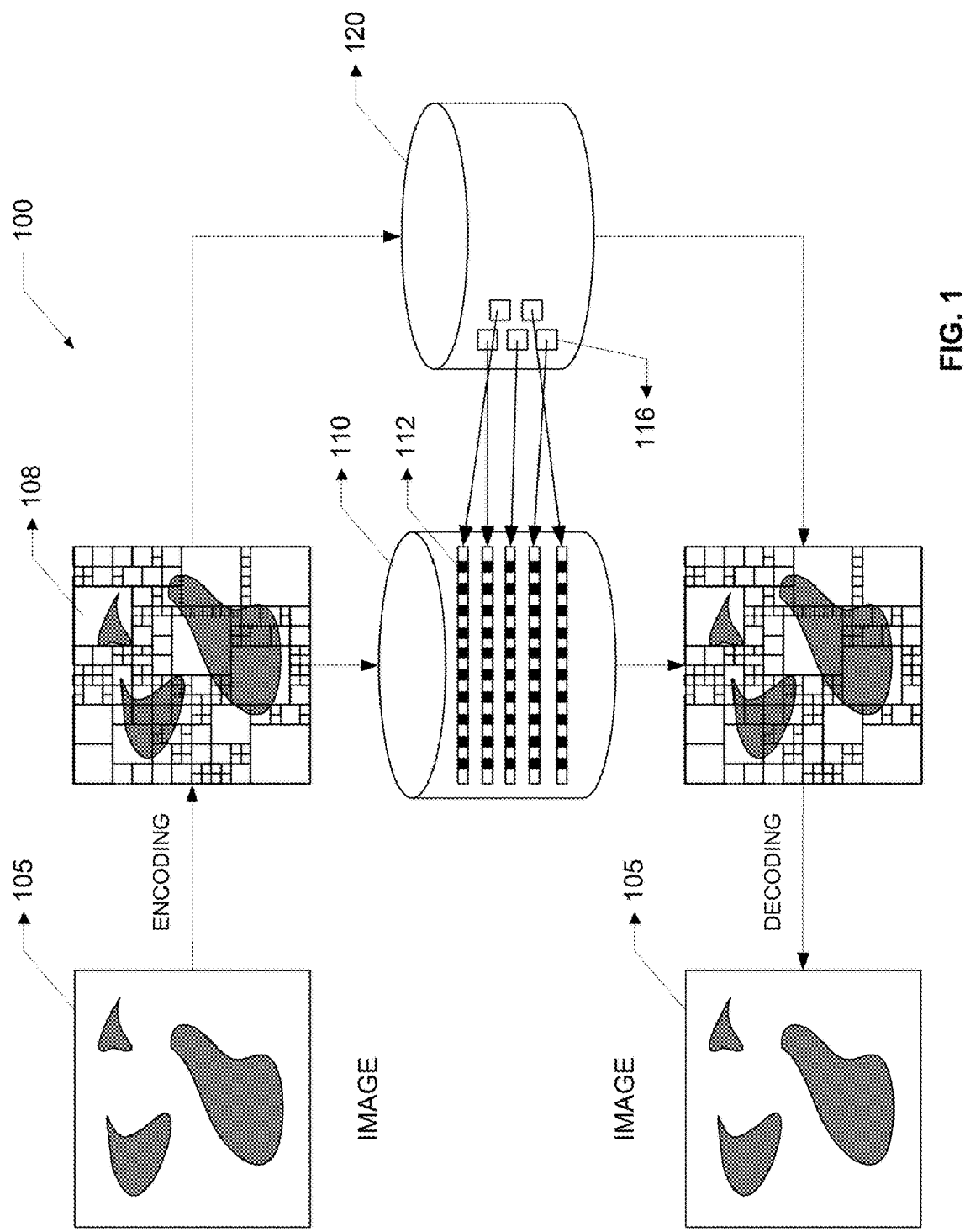
FIG. 1 is a block diagram illustrating an example process for encoding and decoding an image using vector quantization according to an embodiment of the present invention.

Certain embodiments as disclosed herein provide for pattern recognition systems and methods. For example, one method as disclosed herein allows for a digitized image to be segmented into a plurality of image kernels. The image kernels are then analyzed to determine the intensity of each pixel in the kernel. The pixel intensities for an image kernel are then combined into a vector and the vector is stored in a data structure with other vectors for the image. Each vector is indexed to create a composite index for the digitized image that can later be reconstructed using the indices and the vectors.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

A first step in automating microscopic inspection is to create a virtual slide, i.e., a high resolution digital image of an entire slide. The systems and methods of the present invention overcome many of the disadvantages of the existing image pattern recognition techniques by employing a technique known as vector quantization ("VQ"). VQ is a computational technique for encoding bitstreams using a vocabulary. VQ is particularly suitable for encoding images that have significant redundancy.

VQ is a useful approach for pattern recognition in imagery data that is repetitive in nature. Fundamentally, pattern recognition using VQ is based on comparing previously encoded patterns (i.e., particular characteristics) with new imagery data. The computational challenges of organizing and retrieving significant volumes of imagery data are immense and prior to the present invention have prevented the application of VQ to pattern recognition in large images. The implementation of VQ in accordance with the systems and methods described herein overcomes these computational challenges and makes pattern recognition in virtual microscopic images feasible.

The systems and methods for VQ-based image pattern recognition of the present invention represent a significant improvement over the prior art for several reasons: First, VQ-based pattern recognition is efficient because encoding of image information is performed once, after which pattern matching can be performed solely by correlating VQ vector information, rather than comparison of image information. Second, VQ encodes all image characteristics without need for predetermined heuristics that identify significant features. Pattern matching can be morphometric, colorimetric, context-dependent, etc., depending upon the training used to create vectors of interest. Finally, VQ pattern recognition learns automatically as it is used. Statistical methods determine the significance of vectors that are characteristic for particular patterns.

FIG. 1 illustrates a process 100 for encoding an image using VQ. Process 100 begins after digital image 105 is analyzed and segmented into small rectangular regions called image kernels 108. Image 105 can be, for example, a liver sample comprising one or more image characteristics. An image characteristic is any user-defined attribute that may be exhibited by a region of an image, such as a cluster of tumor cells or region of analysis ("ROA") within a tissue microarray ("TMA") spot. Kernels can vary in size from 1 to 64 pixels per side, or 1 to 4096 total pixels per kernel. Larger kernel sizes may also be employed as will be understood by those skilled in the art.

Next, a vector 112 corresponding to each kernel 108 is generated and stored in vocabulary 110. Vocabulary 110 is a data structure comprising the vectors 112 corresponding to kernels 108. The data structure may be a database, a file, a linked list, or some other collection of vectors 112. A vector 112 is a one-dimensional array of scalars. In vector quantization, each vector represents the pixel intensities of all pixels in a kernel, for each of three color channels. For example, a kernel comprising 15 pixels by 15 pixels corresponds to a vector with 225*3=675 intensity values.

Vector index file 120 is a collection of indices 116 that correspond (i.e., "point") to the vectors 112 that comprise image 105. Each vector 112 in vocabulary 110 is assigned a unique index 116. In one embodiment, an index 116 is a unique 4-byte integer. Once an image is completely segmented into a plurality of kernels 108, corresponding vectors 112 are generated for each kernel 108 and the vectors 112 are indexed. At this point, the image is said to be vector quantized, or VQ-encoded. After image 105 has been VQ-encoded, it is completely represented by a series of indices 116 in vector index file 120 (together with the contents of the vocabulary 110).

Image 105 can be reconstructed (i.e., VQ-decoded) using the indices 116 to lookup each vector 112 in vocabulary 110. Decoding uses the vectors 112 to recreate the corresponding kernels 108 necessary to render image 105.

Capitalizing on redundant kernels is a significant component of VQ-encoding. During the VQ-encoding process, each newly identified kernel 108 is compared to the vectors 112 already stored in the vocabulary. If a sufficiently close match is found with a vector 112 already in vocabulary 110, then the vector 112 for that newly identified kernel is re-used. If, however, a sufficiently close match is not found with a vector 112 already in vocabulary 110, then the vector 112 for that newly identified kernel is appended to vocabulary 110. As a result, over time vocabulary 110 is populated with nearly all kernels 108 which are found in the imagery data for a particular image type, e.g., samples of liver tissue. Thus, as slides of a given tissue type are encoded, more and more of the kernels 108 which appear in such slides are stored in the vocabulary 110, and correspondingly fewer new vectors 112 need be added. In one embodiment, a mature vocabulary 110 may VQ-encode an image 105 without adding any new vectors 112 to the vocabulary 110.

Searching vocabulary 110 for pre-existing vectors to reuse is computationally expensive. The systems and methods of the present invention achieve, by several orders of magnitude, a reduction in processing time and memory usage. One technique for accomplishing this improved processing efficiency includes the computation of a correlation between a vector and its corresponding image characteristic, as described in the next figure.

Figure 2:
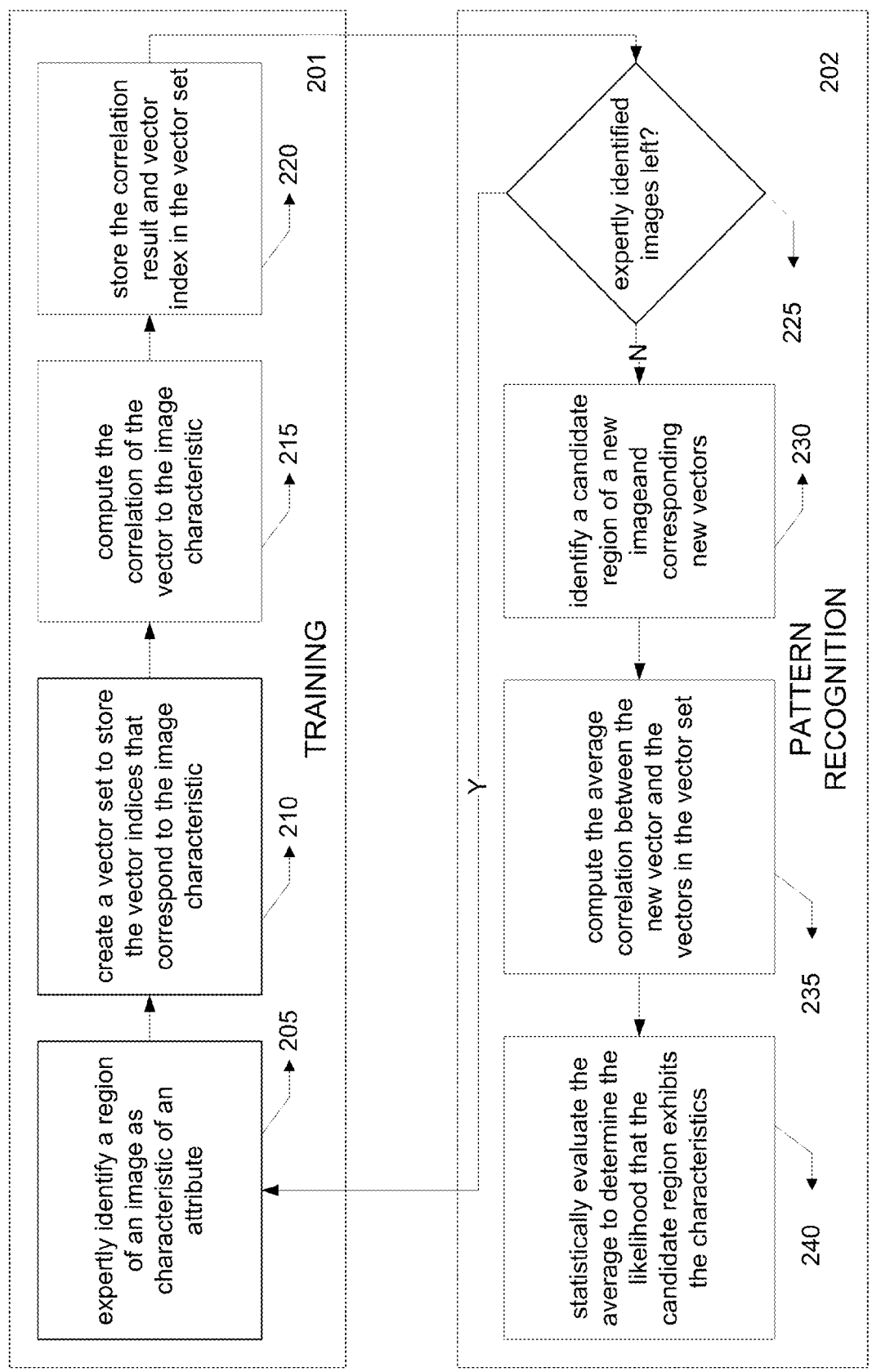
FIG. 2 is a flow diagram illustrating an example method for image pattern recognition according to an embodiment of the present invention.

FIG. 2 is a flow diagram illustrating a method for image pattern recognition according to an embodiment of the invention. The image pattern recognition process can be divided into a training stage 201 and a pattern recognition stage 202. In the first step 205 of the training stage 201, a human expert identifies a region of an image as characteristic of an attribute. For example, an expert in the biological sciences might examine a tissue sample and visibly identify a group of tumor cells or ROAs within a TMA. Typically the attribute is recognized by the expert without regard to the specific visual characteristics which comprise the attribute, e.g. morphometric, colorimetric, and/or context-dependent features of the image.

In step 210, a vector set is created to store each vector index that corresponds to a vector found in the image characteristic. Multiple vector sets can be created for different characteristics. For example, different vector sets can be created for different tumor types identified by experts in step 205. For instance, one vector set might be developed for melanoma and another for leukemia.

In step 215, the correlation of each vector to the image characteristic is computed. In one embodiment, the correlation is computed using the following ratio:

$$\frac{\text{Number of times the vector is observed in the region exhibiting the characteristic}}{\text{Number of times the vector is observed overall}}$$

The correlation of each vector to the image characteristic is stored in the vector set along with the corresponding vector index in step 220. Vector sets contain vector indices together with their associated correlation to the previously identified image characteristic. In step 225, the training stage is repeated for the next expertly identified image. As a result of a series of images passing through training stage 201, a correlation between individual vectors and a particular vector set will be computed. The more images used to train the system, the more statistically sound the correlation result will be for an individual vector and a particular vector set. When a sufficiently large number of images have been processed and the individual vectors correlated with a particular characteristic represented by a vector set, the training stage will be complete and pattern recognition can begin.

If a particular vector is only ever found in regions of images exhibiting the characteristic, then the correlation between the vector and the characteristic will have a maximum value of one (1), which is 100% correlation. In this case, the vector will have a high predictive value for the characteristic. On the other hand, if a particular vector is never found in regions of images exhibiting the characteristic, the correlation will have a minimum value of zero (0), which is 100% non-correlation. In this case, the vector will have a high predictive value for the absence of the characteristic. Finally, if a particular vector is sometimes found in regions exhibiting the characteristic and sometimes it is not, then the correlation value (also referred to as "ratio") will be somewhere between 0 and 1. If the ratio is near one-half, the vector will have a low predictive value for the presence of absence of the characteristic.

In the first step of the pattern recognition stage, step 230, a candidate region of a new image is identified. A candidate region is a region of an image that has not been expertly identified to possess any regions containing any image characteristic of one or more attributes. In many cases the candidate region of an image is the entire image, or that portion of the image which contains sample tissue. As such, the vectors corresponding to the candidate region may or may not have been encountered during the training stage. In step 235, the average of the correlations to a particular vector set corresponding to the vectors in the candidate region is computed. In step 240, the average is evaluated to determine the likelihood that the candidate region exhibits the characteristic represented by one or more vector sets. High average correlations indicate a high probability that the candidate region exhibits the characteristic, while low average correlations indicate a low probability. The candidate region may be compared to multiple vector sets to determine the probability that the region exhibits various different characteristics. For example, an image of histology tissue may be compared to various vector sets which represent the visual characteristics of different types of tumors, to determine the likelihood that the tissue contains a tumor, and if so, the type of tumor. A significant advantage of the described technique for pattern recognition is that not only are candidate regions classified by characteristics they are likely to exhibit, but the actual probability that they do so is computed.

Figure 3:
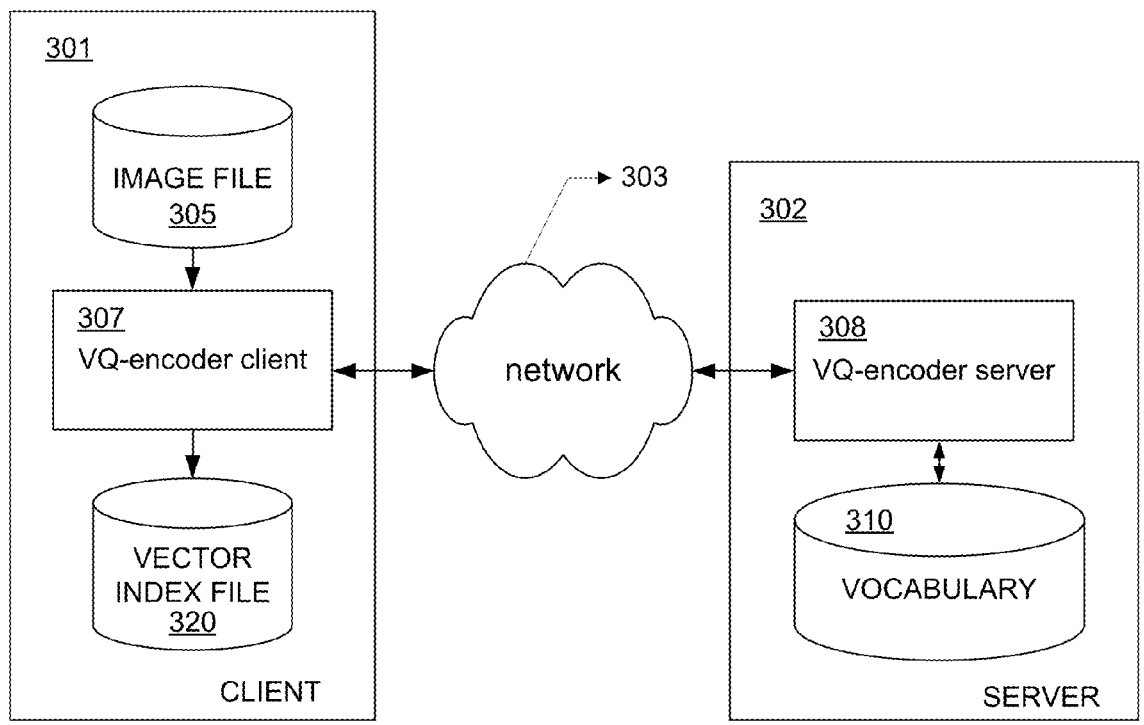
FIG. 3 is a block diagram illustrating an example client/server implementation according to an embodiment of the present invention.

In one embodiment, the systems and methods for image pattern recognition are implemented using a distributed client/server architecture. FIG. 3 illustrates a client/server embodiment of the present invention. Server 302 comprises the VQ-encoding server software 308 and vocabulary 310, and server 302 communicates with one or more clients 301 over a network 303, for example a LAN/WAN communications channel. Clients 301 comprise the VQ-encoding client software 307, which process image files 305 to generate vector index files 320. In this embodiment, vocabulary 310 is located centrally on server 302, providing shared access to clients 301. Vocabulary centralization facilitates database maintenance and eliminates the need to synchronize distributed vocabularies as additional vectors are appended. In addition, a client/server implementation permits the concentration of computationally intensive tasks, such as searching and indexing, to be performed at a central location, relieving clients 301 from the burden.

For large vocabularies the time required to index vocabulary 310 takes about twice as long as the time required for VQ-encoding a typical image 305. For example, out of a total time of 60 minutes to process an image, the indexing time would be 60 minutes while the VQ-encoding time would be 20 minutes. Of the 20 minutes required for encoding, segmentation of image 305 into kernels requires about 5 minutes, and searching vocabulary 310 requires about 15 minutes. When implemented using the client/server embodiment, a server process 308 can be made continuously available with a pre-indexed vocabulary. The encoding process for any given image will not require re-indexing the vocabulary, eliminating that portion of the processing time. The client/server communication overhead is relatively small compared to the overhead of subdividing the image 105 into kernels (on the client side) and searching the vocabulary 310 for these kernels (on the server side). Thus, dividing the processing between two distributed computers does not add appreciably to the execution time. On the other hand, by distributing the processing, the client-side kernel subdivision may be overlapped against the server-side vocabulary searching, resulting in a net reduction of overall processing time by eliminating the client processing time from the critical path. In this way, an overall encoding time of 60 minutes per slide can be reduced to 15 minutes per slide.

Division of processing labor between client and server in this embodiment has other efficiencies. Indexing and searching the vocabulary 310 is a computer-intensive task, best performed by fast processors equipped with large amounts of memory. Segmenting images 305 into kernels and communicating over the network 303 requires comparatively less processing power. This embodiment enables a small number of powerful server machines 302 to perform processing on behalf of a large number of less-powerful client machines 301, yielding an overall increase in the efficiency of the system. Additionally, vocabulary files 310 are typically quite large, and are often stored on large disk arrays (e.g. RAID), while vector index files 320 are several orders of magnitude smaller, and can be stored on ordinary computer disks.

In addition to a client/server embodiment, various other aspects of the systems and methods for image pattern recognition can be employed to improve both the efficiency and accuracy. In one embodiment, for example, encoder 307 can be programmed to transform the entire image from the RGB ("red-green-blue") color-space to the YCRCB ("intensity-red-blue") color space prior to encoding. As kernels are matched to vectors in the vocabulary 310, the Y channel values are matched more carefully than the C channel values, because human perception of image resolution relies primarily on differences in intensity, rather than differences in color. This prioritization enables lower tolerances in certain comparisons without compromising the information content of the kernels. By allowing the lower tolerances, more correllations are found. Accordingly, the vocabulary 310 is smaller, which results in a decrease in size for the vector index 320, and index search times are therefore reduced.

In another aspect of the invention, color channel optimization can be implemented to further reduce the size of vocabulary file 310. Human perception of differences in image intensity values is non-linear; it is most sensitive in the middle of the range (moderate intensity), and least sensitive at the extremes (bright or dark). Encoder 307 can be configured to take advantage of this so that as kernels are matched to vectors in the vocabulary 310, Y channel values in the middle of the intensity range are matched with a closer tolerance than Y channel values at the ends of the range. This prioritization similarly enables lower tolerances in certain comparisons without compromising the information content of the kernels 108. As discussed above, the lower tolerances for certain less critical comparisons advantageously results in a significantly smaller size vocabulary 310, thereby significantly reducing index search times.

In yet another aspect, differential encoding can be employed for reducing the bit-size of C channel values within the YCRCB color space. With differential encoding, each intensity value within a vector is replaced by the difference between the intensity value and the average value of the three nearest neighbors to its upper left. For example, if the value represents the pixel at coordinate position [x, y], the average is computed of the values for pixels [x−1, y], [x−1, y−1], and [x, y−1]. (Note that in the standard convention for digital images, [0, 0] is the upper left corner of the image, with x increasing to the right, and y increasing downward.) In addition, for the C channel intensity values, intensities are typically stored as 8-bit values, but the difference between adjacent intensities can be represented by 4-bit values without loss of fidelity. This reduces the range of each value from 256 (for intensity) to 16 (for differential). Accordingly, a substantial reduction in the size of the index trees for each value is gained, thereby yielding faster searching of vocabulary 310.

The data structure used to search vocabulary indices by the encoder 308 is an important determinant of system resource usage and encoding performance. In one embodiment, a new data structure called a vector tree can be used to store and search vector indices. A vector tree comprises a balanced tree wherein each leaf node is the root of another tree. The top-level tree represents the first dimension of each kernel. The leaf nodes of this tree contain trees which represent the second dimension of each kernel, for each defined value of the first dimension. The leaf nodes of each second-level tree contain trees which represent the third dimensions, and so on. In addition to containing the root for the next-level tree, each leaf node may also represent the last dimension of a defined vector. In this case the vector's index is also stored in the leaf node. This arrangement enables multi-dimensional vectors of different sizes to be stored together in one structure, facilitating concurrent searching for multiple kernels having different dimensions.

In one embodiment, nested kernel logic is used to store vector intensity values more efficiently and thereby reducing index search times. Kernels of size k×k pixels have $3k^2$ intensity values. The size of these vectors is a key driver of the size of the vocabulary file 310, as well as the size of vocabulary indices and the time required for vector index searches.

Figure 4:
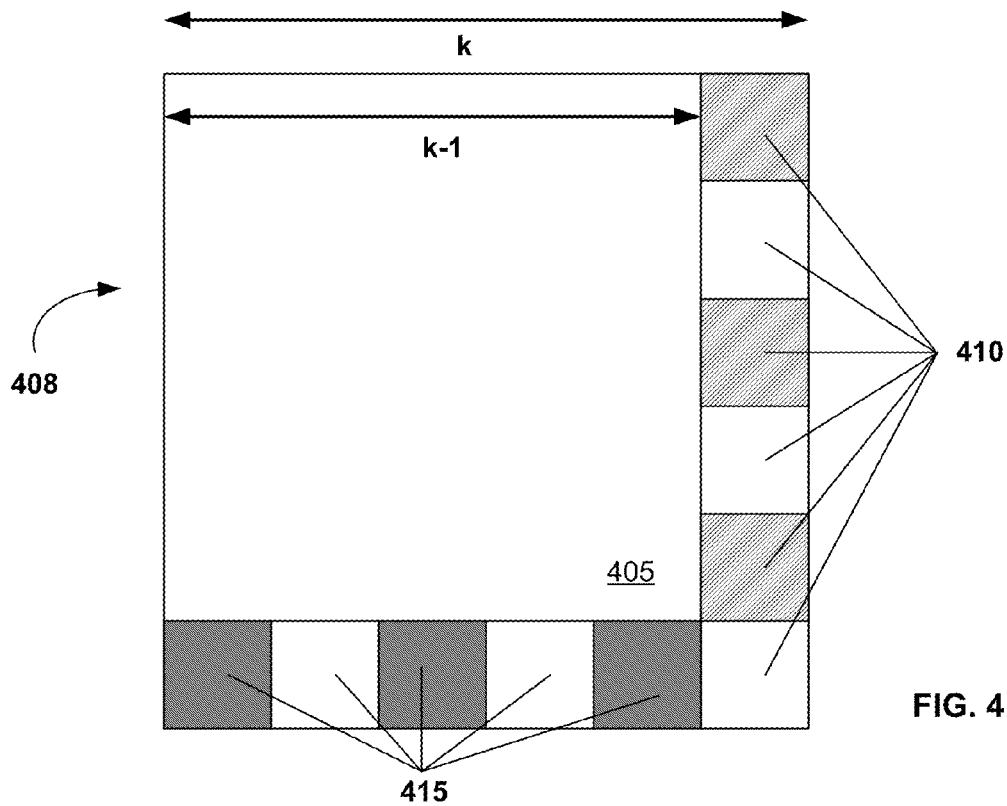
FIG. 4 is a block diagram illustrating an example nested kernel logic according to an embodiment of the present invention.

In one embodiment, kernels are represented in nested fashion which reduces the number of intensity values required for each kernel to 6 k. FIG. 4 is a diagram illustrating nested kernel logic that can be used to store vectors. Using this nested kernel logic, each kernel 408 of size k ("outer kernel") is assumed to have a previously located kernel 405 of size k−1 inside it ("inner kernel"), with their upper-left corners aligned. In actual practice this always occurs, because the encoding logic tries searching the vocabulary for successively larger kernels at a pixel location until a "not found" occurs, as described below with reference to variable sized kernel logic.

This enables the outer kernel 408 to be represented by 6 k (i.e. 3(2 k)) values. The factor of three is from the three color channels. Of the 2 k, the first value is represented by the index of the inner kernel 405 and the next k values are the pixels 410 along the right edge of the outer kernel 408. The remaining k−1 values are the pixels 415 along the bottom edge of the outer kernel 408.

Representing kernels with 6 k intensity values instead of $3k^2$ intensity values provides a significant reduction in the number of valued needed to represent a vector. For example, for a kernel of size k=15 pixels, there would be 90 values to store (instead of 675) for that kernel. This dramatically reduces the size of the vocabulary file and the corresponding vector trees used by the VQ-encoder for index searching. The encoding search times are similarly reduced.

Referring back to FIG. 1, another technique for decreasing search time involves VQ-encoding an image 105 using variable-size kernel logic. Exemplary kernels 108 comprising VQ-encoded image 105 in FIG. 1 are variable in size. This technique enables mapping of image data by kernels of varying size, accommodating a wide range of objects, structures, and features in the encoded images. It also removes the need for specifying or deriving an optimum kernel size for a given image.

FIG. 5 is a flow diagram illustrating an example process for creating variable sized kernels according to an embodiment of the present invention. In step 505, the VQ-encoder, iterates through each pixel location from upper left to lower right. In step 510 (performed for each pixel location), the vocabulary is searched for a matching kernel of size n (a parameterized value for the smallest kernel size, typically 3 or 4). In step 515, if the kernel is found, n is incremented in step 520 and the search for a kernel of size n+1 is invoked to try to find an existing kernel of size n×n that matches the identified square region. The encoder loops through the vocabulary trying sequentially larger kernels until a "not found" condition occurs in step 515.

In step 525, if a match between the identified image location and an existing n×n kernel is not found, then the identified square region is mapped to the existing kernel of size n−1×n−1 that was found in the previous iteration of the loop. The use count for the n−1×n−1 kernel will be incremented to indicate that another instance of the kernel is being used to map a region of the image. As for the n×n region that was searched but never found, in step 530 that region will be added to the vocabulary (and appropriately indexed) and the use count for the new kernel will be initialized to one. Each time a kernel is matched, the use count is incremented, and when the use count exceeds a parameterized threshold (typically 20) the kernel may be used for image encoding. In this way the vocabulary is continuously enlarged over time with ever-larger kernels which contain ever-more image information.

The above described embodiment describes the use of variable size square kernels. In another embodiment, rectangular kernels may also the employed by incrementing the size kernel to be searched for to n+1×n, rather than n+1×n+1. For example, in step 515, if the kernel is found, the size of one side of the kernel is incremented in step 520 and the search for a kernel of size n+1×n is invoked to try to find an existing kernel of size n+1×n that matches the identified rectangular region. The encoder loops through the vocabulary trying sequentially larger rectangular or square kernels until a "not found" condition occurs in step 515.

In an exemplary embodiment, a feasibility study was conducted using liver histology sections to determine the performance and storage requirements of systems and methods described herein. One goal of this study was to verify that VQ-encoding of virtual microscope slide images could be performed on readily available computing hardware in run times that are compatible with practical applications. Another goal was to determine how quickly vocabulary sizes and corresponding index sizes converge. Convergence occurs as slides of a given tissue type are encoded. Over time, as more and more of the kernels which appear in such slides are stored in the vocabulary, correspondingly fewer new vectors need be added.

The study was performing using 49 liver tissue slides. These slides were standard H&E-stained histology samples. The slides were scanned with a ScanScope® T108 scanner. A virtual slide TIFF file was created for each slide at 54,000 pixels per inch (0.5 μm per pixel) using a Nikon 20x/0.75 Plan Apochromat objective lens, and compressed at a compression ratio of 20:1 using Aperio Technologies, Inc.'s JPEG2000 compression software using 7/9 wavelets. In compressed form, each virtual slide TIFF file comprised approximately 250 MB. FIG. 6 is a table that summarizes a representative sample of the slides used for this study.

The method used in the study employed a tolerance parameter to determine how closely kernels from an image must match vectors in the vocabulary. The study was done three times with three different values for the tolerance parameter: 4% (high), 5% (medium), and 6% (low). In each case, the vocabulary was initially empty. In other words, the three studies began with no pre-existing kernels in the vocabulary. Each of the slide images was encoded against the vocabulary yielding a vector index file. The encoding process progressively added kernels to the vocabulary. Each slide was decoded after encoding and visually inspected using Aperio Technologies' Imagescope™ viewer to verify that the encoding/decoding process was successful.

The slides were encoded using a Dell Dimension 700 MHz Pentium III desktop computer with 1 GB RAM and 80 GB hard disk. This computer ran Windows 2000 Professional with all unneeded operating system services disabled. Timing, disk and memory measurements were performed by the VQ-encoding software itself.

A sample of the results from the first study is shown in the table in FIG. 7. This table shows processing statistics for the first five slides processed, and for the last five slides processed (out of 49 total slides). The last three columns show the processing times. The average index load time was 30 minutes, which increased continuously throughout the study to a maximum of 39 minutes. The average encoding time was 17 minutes with a max of 24 minutes. The overall processing time averaged 48 minutes, with a maximum total time of 63 minutes.

Figure 8:
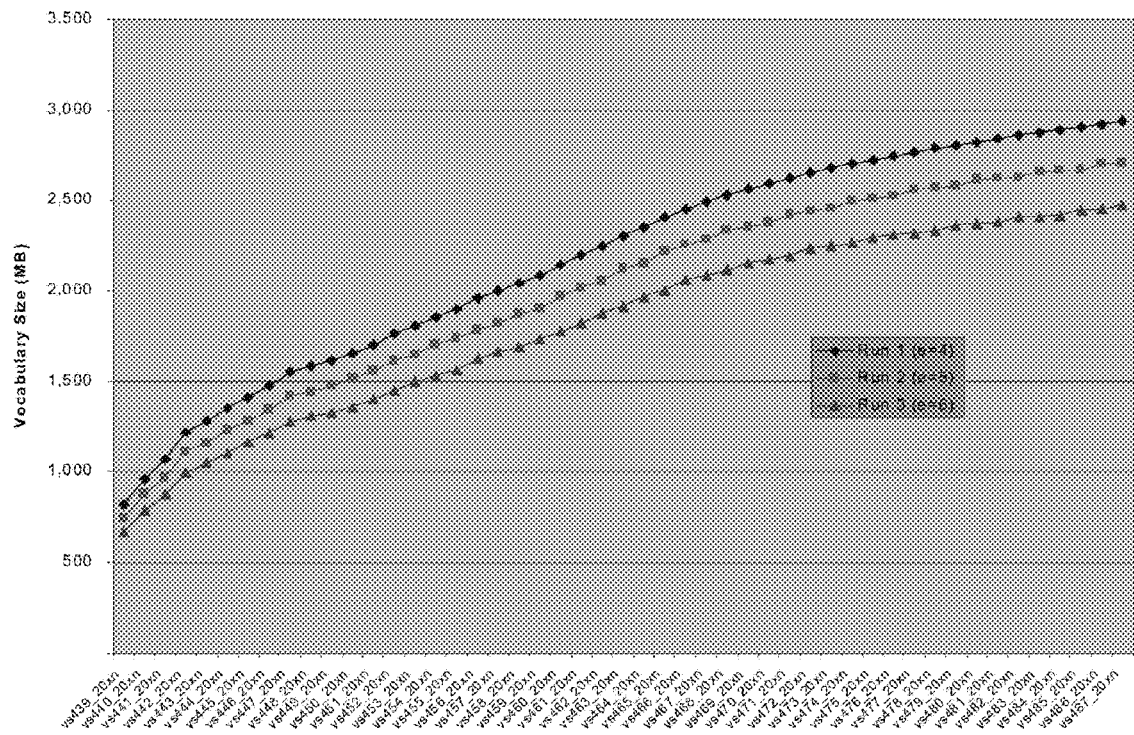
FIG. 8 is a graph diagram illustrating an example change in vocabulary size as slides were processed during a study according to an embodiment of the present invention.

A key observation from this study was whether the vocabulary size would converge, that is, reach a point where successive new slides added fewer and fewer kernels to the database. The cumulative total of vectors column (#vectors) in FIG. 7 shows that the first few slides added significantly more vectors to the vocabulary than the last few slides. After 49 slides, a substantial amount of convergence had taken place. FIG. 8 is a graph which shows the change in vocabulary size as slides were processed. Although the vocabulary never reached an asymptote, the rate of growth after 49 slides substantially slowed.

Figure 9:
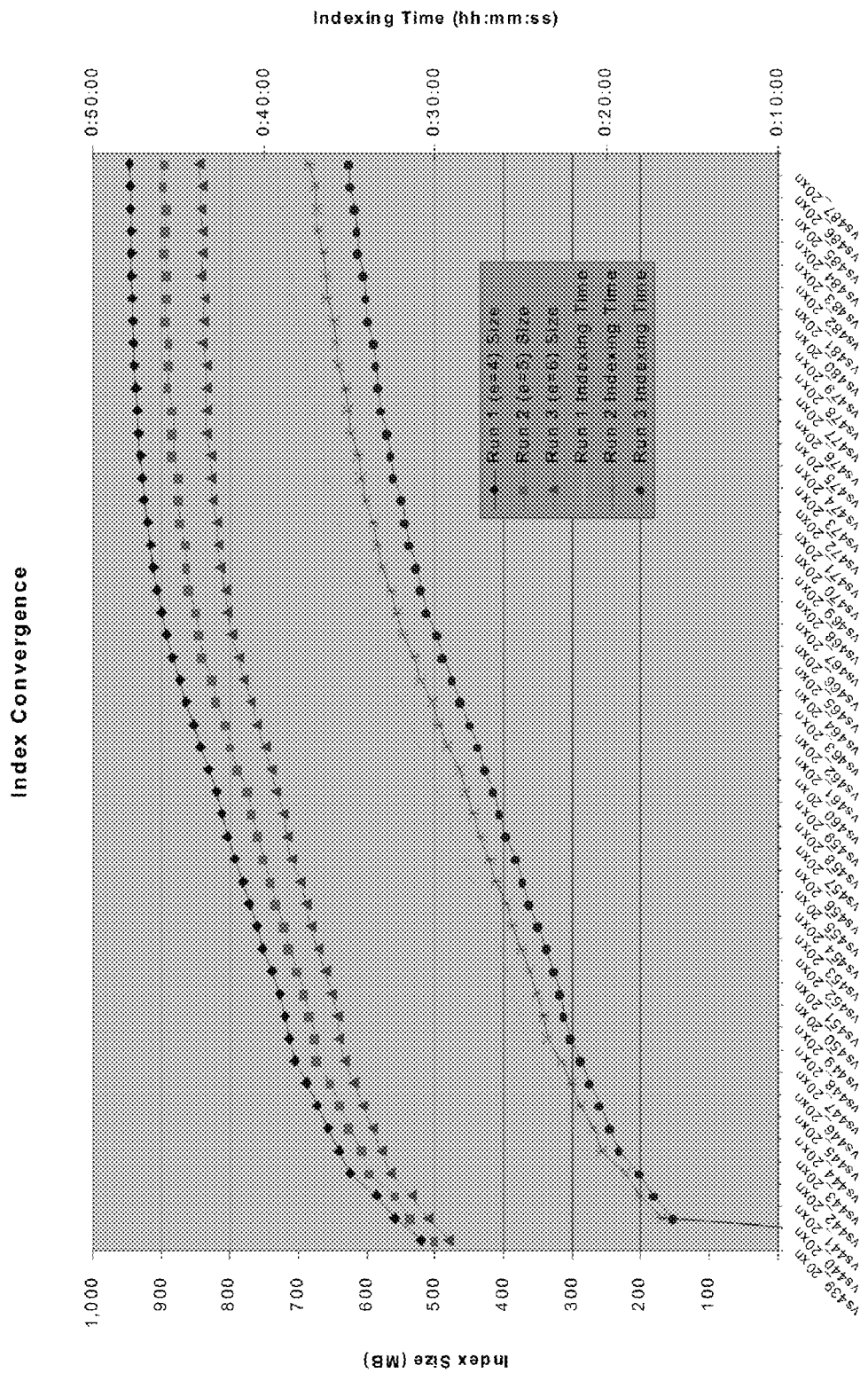
FIG. 9 is a graph diagram illustrating an example change in index size as slides were processed during a study according to an embodiment of the present invention.

Another key observation from this study was whether the index size would "converge", and how large the memory-resident index would be. The size of vector index column (idx MB) in FIG. 7 shows that the initial index size was 520 MB after only one slide, but thereafter the growth slowed considerably and nearly stopped altogether. FIG. 9 is a graph which shows the change in index size as slides were processed. The index size never exceeded the physical memory available on the machine (1 GB), so paging was never required. If the index cannot remain memory-resident encoding performance would decrease dramatically. FIG. 9 also shows the index processing time increasing as slides are processed. In the study, the index load time did not stop growing as fast as the index size because as the total index becomes larger each new index requires more time to insert.

Micrometastasis is a practically useful rare-event finding application that can benefit greatly from the systems and methods of the present invention. For patients with tumors, a key question is whether cancer cells are metastasizing, i.e. breaking free from the tumor and traveling to other areas of the body through the bloodstream. Micrometastasis is the presence of small clusters of 1-10 cancer cells in blood. To determine whether such metastasis is taking place, up to fifty cytology slides are prepared with a patient's blood. These slides are then examined with a microscope by a pathologist to determine if micrometastasis clusters are present.

An enrichment procedure is typically used to increase the occurrence of potential tumor cells in a block sample. Tumor cells are differentiated from normal cells based on the following morphological features:

a) Size: typically at least 20 μm diameter (normal white blood cells are 10 μm-15 μm).

b) Nuclear size: Large and usually round (normal nuclei are smaller and/or irregular in shape).

c) Nuclear morphology: Usually one or more nucleoli are present (small dark blue staining regions within the nuclei).

d) Nuclear staining: Usually stained lighter (less hematoxylin) compared to a normal white blood cell.

e) Cytoplasm staining: May be stained bluer (more basophilic) than a normal white blood cell.

f) Nuclear to cytoplasmic ratio: Usually higher than normal white blood cell indicating a larger nucleus.

Differentiation based on these attributes is subtle and requires an experienced pathologist for detection. In this type of rare event detection application it is important not to have false negatives, i.e., it is important not to miss micrometastasis clusters despite their sparse occurrence and difficulty of detection.

To reduce the probability of false negatives, slides are treated with an immunocytochemical antibody that is specific to epithelial cells (a type of cell from which tumors frequently derive). The antibody is prepared as a stain which colors cells of epithelial origin red, whereas normal white blood cells remain unstained. This significantly increases the contrast of micrometastasis clusters, simplifying visual detection and reducing the probability of false negatives. With this stain, micrometastasis slides samples can be scanned at a lower resolution, enabling scanning to be performed more quickly.

To further reduce the probability of false negatives, up to fifty slides are visually scanned, and in a typical case 1-10 clusters occur per slide, a very sparse distribution, and it is important for each cluster to be found to ensure a reliable diagnosis. Some false positives may also occur, for example, dust particles which absorb the immunocytochemical stain and appear as red globs, and other debris in the blood sample. All located potential clusters must be examined visually at high magnification to distinguish false positives from genuine micrometastasis clusters.

A threshold is required to determine when a region constitutes a found target. The method can be run iteratively with different threshold values to determine the value which yields the best results. In practical application this threshold would be kept on the low side of optimal to bias the pattern recognition in favor of false positives (reducing the possibility of false negatives).

Figure 10:
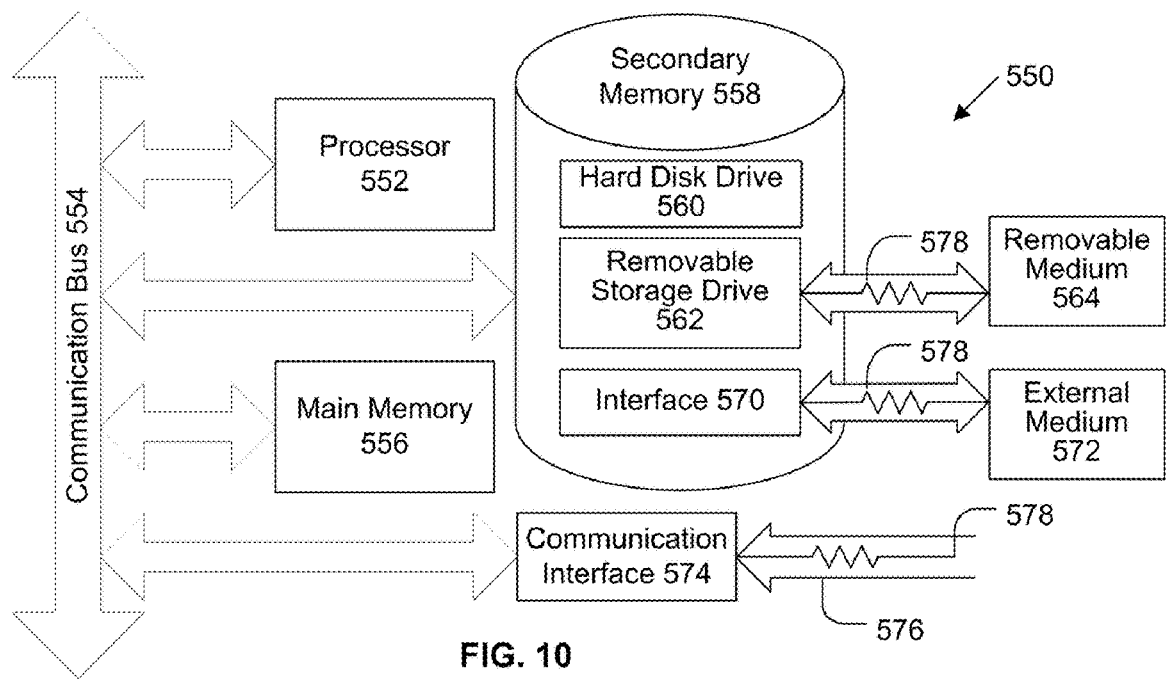
FIG. 10 is a block diagram illustrating an exemplary computer system as may be used in connection with various embodiments described herein.

FIG. 10 is a block diagram illustrating an exemplary computer system 550 that may be used in connection with the various embodiments described herein. For example, the computer system 550 may be used in conjunction with a server computer or client computer previously described with respect to FIG. 3. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency ("RF") link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A non-transitory computer readable media including one or more computer readable mediums having stored thereon one or more sequences of instructions for causing one or more microprocessors to perform the steps for recognition of patterns in a digital image, the steps comprising:
   creating a vector set comprising a plurality of image characteristic vectors, the vector set corresponding to an image characteristic;
   identifying a candidate region of an image, the candidate region comprising a plurality of candidate region vectors;
   determining a correlation for each candidate region vector in the plurality of candidate region vectors with each image characteristic vector in the vector set; and
   calculating the correlations to determine the probability that the candidate region exhibits the image characteristic.

2. The computer readable media of claim 1, wherein the determining step further comprises dividing the number of times an image characteristic vector is observed in the candidate region by the number of times the image characteristic vector is observed overall.

3. The computer readable media of claim 1, wherein the candidate region of an image comprises the entire image.

4. The computer readable media of claim 1, wherein the candidate region of an image comprises a portion of entire image.

5. The computer readable media of claim 1, wherein a high average of the correlations indicates a high probability of a match between an image pattern in the candidate region of the image and the image characteristic.

6. The computer readable media of claim 1, wherein a low average of the correlations indicates a low probability of a match between an image pattern in the candidate region of the image and the image characteristic.

7. The computer readable media of claim 1, wherein the steps further comprise creating a plurality of vector sets, wherein each vector set comprises a plurality of image characteristic vectors and each of the plurality of vector sets corresponds to an image characteristic.

8. The computer readable media of claim 7, wherein the determining step further comprises determining a correlation for each candidate region vector in the plurality of candidate region vectors with each image characteristic vector in a plurality of vector sets.

9. A non-transitory computer readable media including one or more computer readable mediums having stored thereon one or more sequences of instructions for causing one or more microprocessors to perform the steps for recognition of patterns in a digital image, the steps comprising:
   receiving an identification of a region of a digital image containing a desired image characteristic;
   creating a vector set for the identified region, the vector set comprising a plurality of image characteristic vectors;
   receiving an identification of a candidate region of a digital image, the candidate region comprising a plurality of candidate region vectors;
   correlating each candidate region vector in the plurality of candidate region vectors with each image characteristic vector in the vector set to provide a plurality of correlations; and
   calculating the plurality of correlations to determine a probability that the candidate region includes the desired image characteristic.

10. The computer readable media of claim 9, wherein the correlating step further comprises dividing the number of times an image characteristic vector is observed in the candidate region by the number of times the image characteristic vector is observed overall.

11. The computer readable media of claim 9, wherein the candidate region of an image comprises the entire image.

12. The computer readable media of claim 9, wherein the candidate region of an image comprises a portion of entire image.

13. The computer readable media of claim 9, wherein a high average of the correlations indicates a high probability of a match between an image pattern in the candidate region of the image and the image characteristic.

14. The computer readable media of claim 9, wherein a low average of the correlations indicates a low probability of a match between an image pattern in the candidate region of the image and the image characteristic.

15. The computer readable media of claim 9, wherein the steps further comprise creating a plurality of vector sets, wherein each vector set comprises a plurality of image characteristic vectors and each of the plurality of vector sets corresponds to an image characteristic.

16. The computer readable media of claim 15, wherein the determining step further comprises determining a correlation for each candidate region vector in the plurality of candidate region vectors with each image characteristic vector in a plurality of vector sets.

17. A system for recognition of patterns in a digital image, comprising:
- means for storing a vocabulary comprising a plurality of image vectors, each image vector including a plurality of values representing pixel intensities for a plurality of pixels in a portion of a digital image;
- means for storing a plurality of vector sets, each vector set including a plurality of image vectors and corresponding to an image characteristic;
- means for correlating each image vector in a candidate region of a digital image with each image vector in a plurality of vector sets to determine a probability that the desired image characteristic is present in the candidate region of a digital image.

18. The system of claim 17, wherein the means for correlating further comprises means for dividing the number of times an image characteristic vector is observed in the candidate region by the number of times the image characteristic vector is observed overall.

19. The system of claim 18, further comprising means for averaging the correlations to determine the probability that the candidate region includes the desired image characteristic.

20. The system of claim 19, wherein the means for correlating further comprises means for indicating a high probability of a match between an image pattern in the candidate region of the image and the image characteristic when the average of the correlations is high and means for indicating a low probability of a match between an image pattern in the candidate region of the image and the image characteristic when the average of the correlations is low.

* * * * *